Jan. 5, 1954  J. R. ANDERSON  2,665,082
PROPELLER-JET PROPULSION SYSTEM FOR AIRCRAFT
Filed July 29, 1947  7 Sheets-Sheet 1

JAMES R. ANDERSON
INVENTOR
BY Stevens, Davis + Miller
ATTORNEYS

Jan. 5, 1954 J. R. ANDERSON 2,665,082
PROPELLER-JET PROPULSION SYSTEM FOR AIRCRAFT
Filed July 29, 1947 7 Sheets-Sheet 4

JAMES R. ANDERSON
INVENTOR
BY Stevens, Davis & Miller
ATTORNEYS

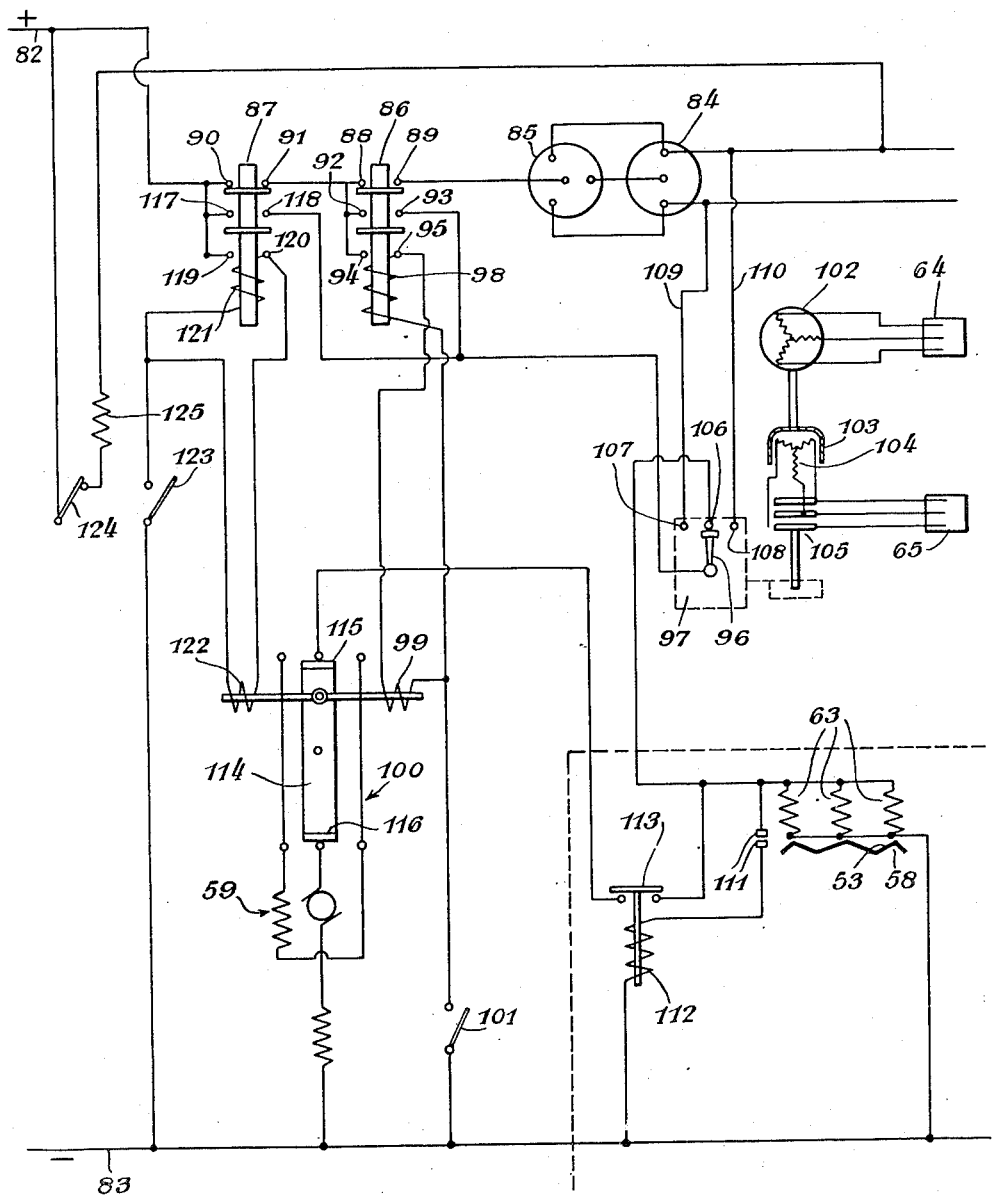

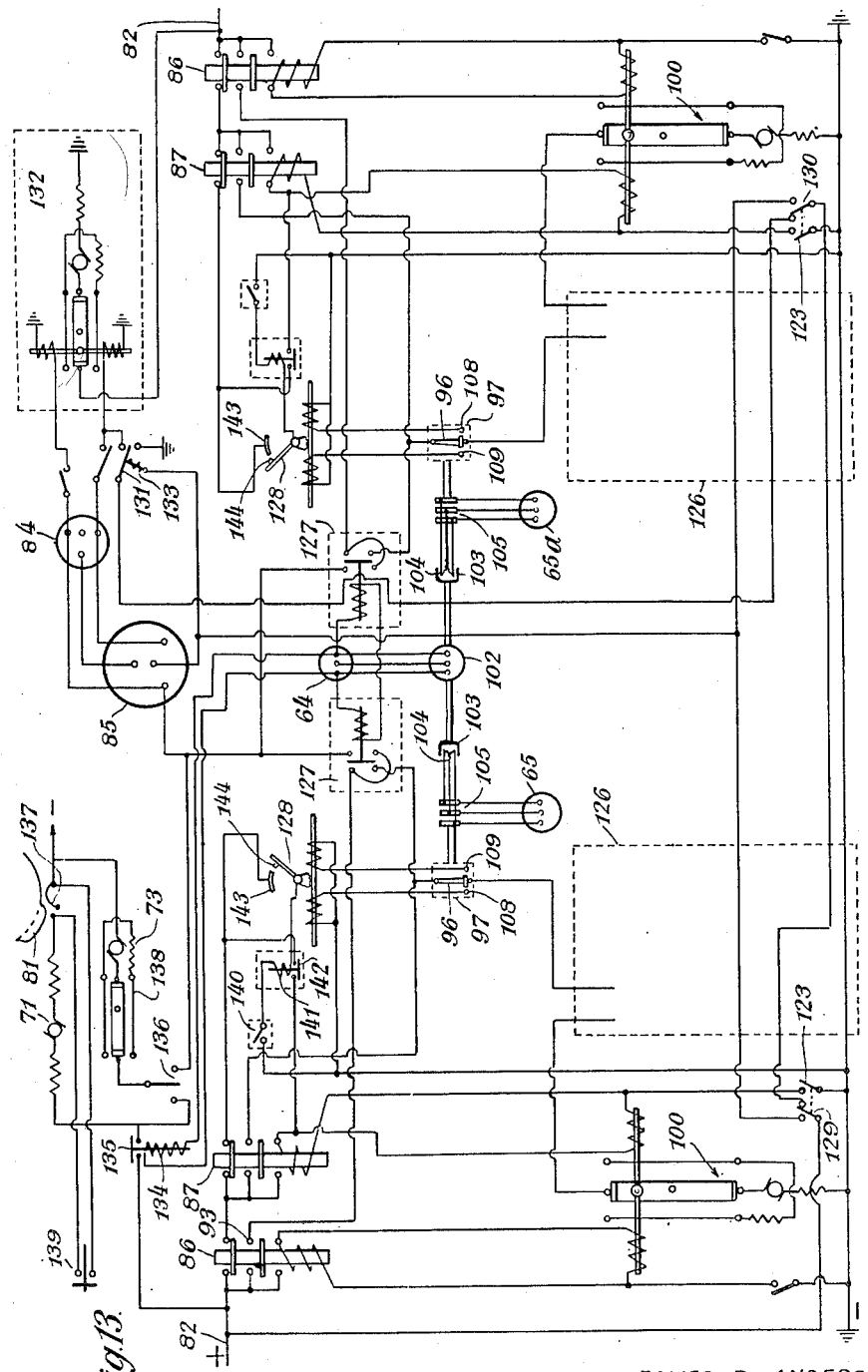

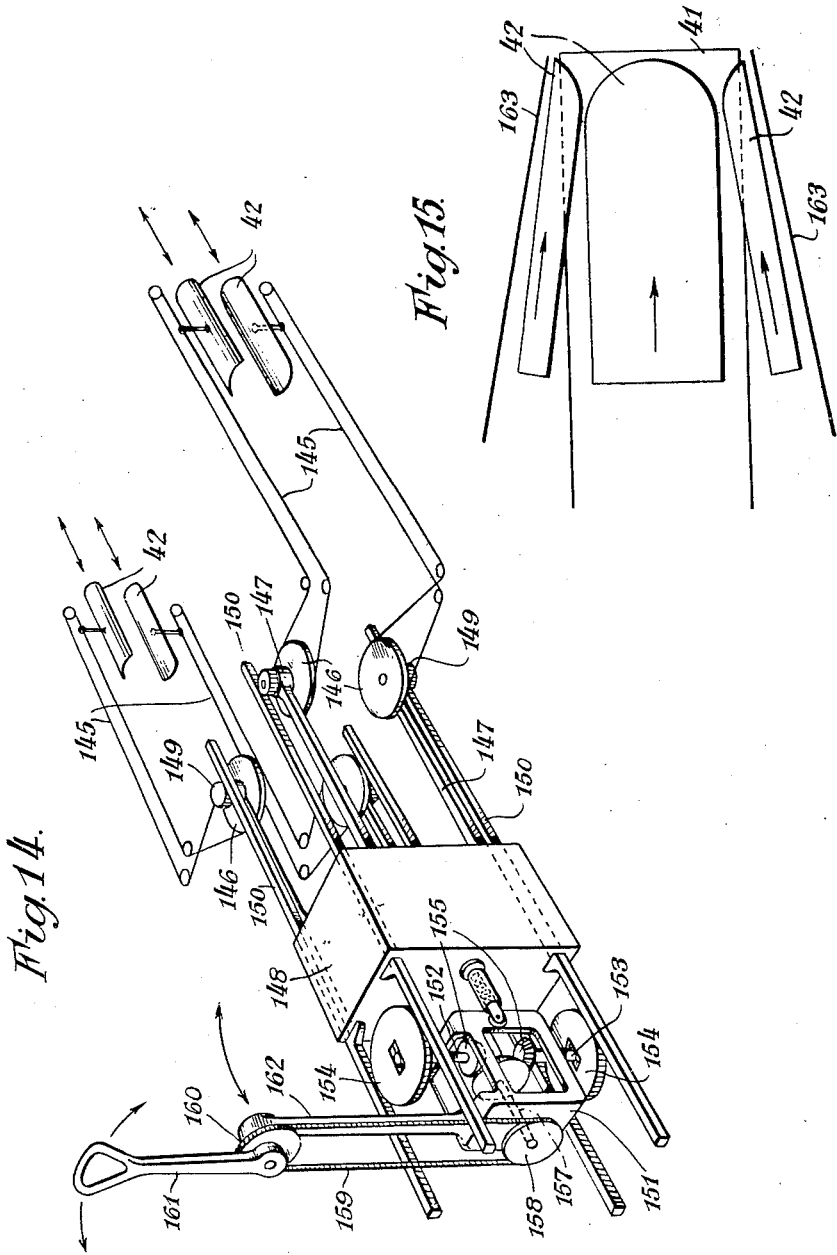

Patented Jan. 5, 1954

2,665,082

UNITED STATES PATENT OFFICE 2,665,082

PROPELLER-JET PROPULSION SYSTEM FOR AIRCRAFT

James Robert Anderson, London, England

Application July 29, 1947, Serial No. 764,517

3 Claims. (Cl. 244—7)

This invention relates to aircraft in which motive power is provided by one or more gas turbine units adapted to drive an airscrew or airscrews. Certain features of the invention are applicable to aircraft of the customary type which, in all normal flight conditions, maintain an attitude not far removed from the horizontal, whilst certain other features are applicable only or mainly to aircraft of the kind adapted to operate either as a helicopter or as a normal aircraft, and designed to ascend and descend with the fuselage in a substantially vertical attitude, so that the airscrews provide direct lift, and to fly in a substantially horizontal attitude.

One object of the invention is to provide an arrangement in which the exhaust jet or jets from the turbine or turbines may be used to propel the aircraft either in combination with the airscrews or alone. Another object is to provide an aircraft of the special kind above referred to, in which the airscrews may be driven by any one or more of several turbines, or may be disconnected from the turbines and locked in a position in which their blades serve as auxiliary wings, the aircraft then being propelled solely by the exhaust jets from the turbine units.

According to the invention, in an aircraft having one or more gas turbine units for providing motive power the said unit or units is or are adapted to drive an airscrew or airscrews through disconnectible clutch means, and also to provide an exhaust jet or jets for propelling the aircraft by jet reaction.

The clutch means are preferably of the positive engagement type, and synchronizing means are provided for bringing the mating elements of the clutch means into synchronism prior to engagement by varying the speed of rotation of either the air screw unit or the turbine or turbines, the mating elements being preferably moved automatically into engagement one with the other when their speeds are synchronized.

In an aircraft of the kind adapted to ascend or descend with the fuselage in a substantially vertical attitude, and to fly in a substantially horizontal attitude, means may be provided for locking the airscrew or airscrews, when the clutch means are disconnected, in such a position that they serve as auxiliary wings.

Two or more gas turbine units may be coupled to a common driving element from which the drive is transmitted to a single airscrew or an airscrew unit comprising a pair of co-axial counter-rotating airscrews, the disconnectible clutch means being provided between each gas turbine unit and the common driving element.

The invention is hereinafter described with reference to the accompanying drawings, in which:

Figure 7 is a view, to a still larger scale, of a part of Figure 4, some of the parts being shown in section;

Figures 8, 9, 10 and 11 are detail views of the clutch elements shown in Figure 7;

Figure 12 is a diagram of an electrical circuit including means for engaging and disengaging the clutch between the gas turbine unit and airscrew in an aircraft as shown in Figure 1;

Figure 13 is a diagram of an electrical circuit similar to that shown in Figure 12, for an aircraft as shown in Figure 2.

Figure 14 is a perspective view showing mechanism for operating extensible deflectors for controlling the direction of emission of the exhaust jets from the gas turbine units; and Figure 15 is an enlarged view of the rear end of a jet tube showing the deflectors.

Figure 1:
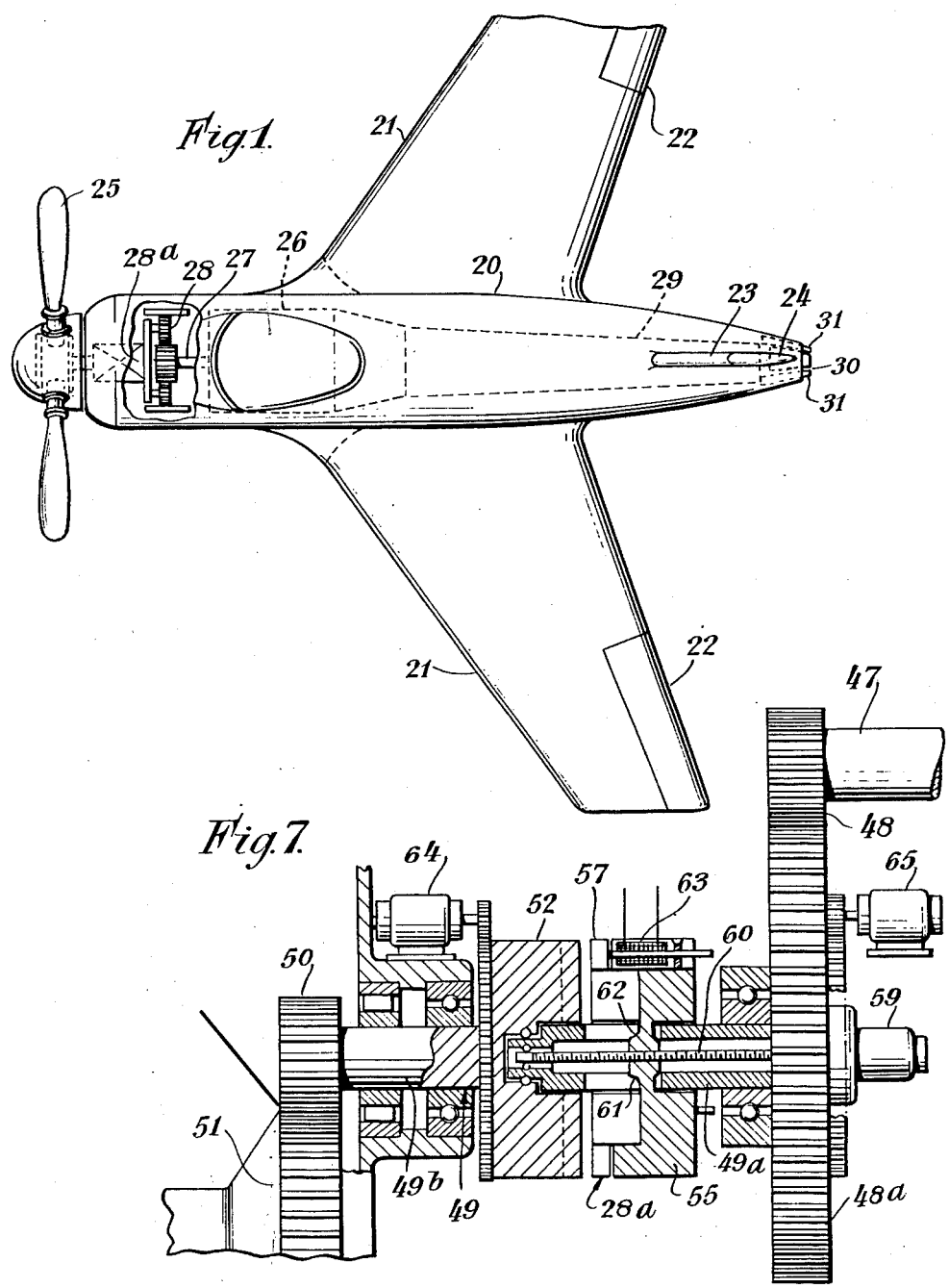
Figure 1 is a plan view of one form of aircraft according to the invention, the aircraft being of the customary type which normally flies in an attitude not far removed from the horizontal.

The aircraft shown in Figure 1 comprises a fuselage 20, wings 21, 21 fitted with ailerons 22, 22, a fin 23 and rudder 24, and a variable pitch airscrew 25 having three blades. A gas turbine unit 26 is mounted in the fuselage, and drives the airscrew 25 through a shaft 27 and gearing indicated diagrammatically at 28, a clutch 28ª, as hereinafter described, being provided between the gearing and the air screw. The exhaust efflux from the gas turbine unit 26 passes through a jet tube 29 to a nozzle 30 which is fitted with deflectors 31 arranged to vary the direction of emission of the jet.

Figure 2:
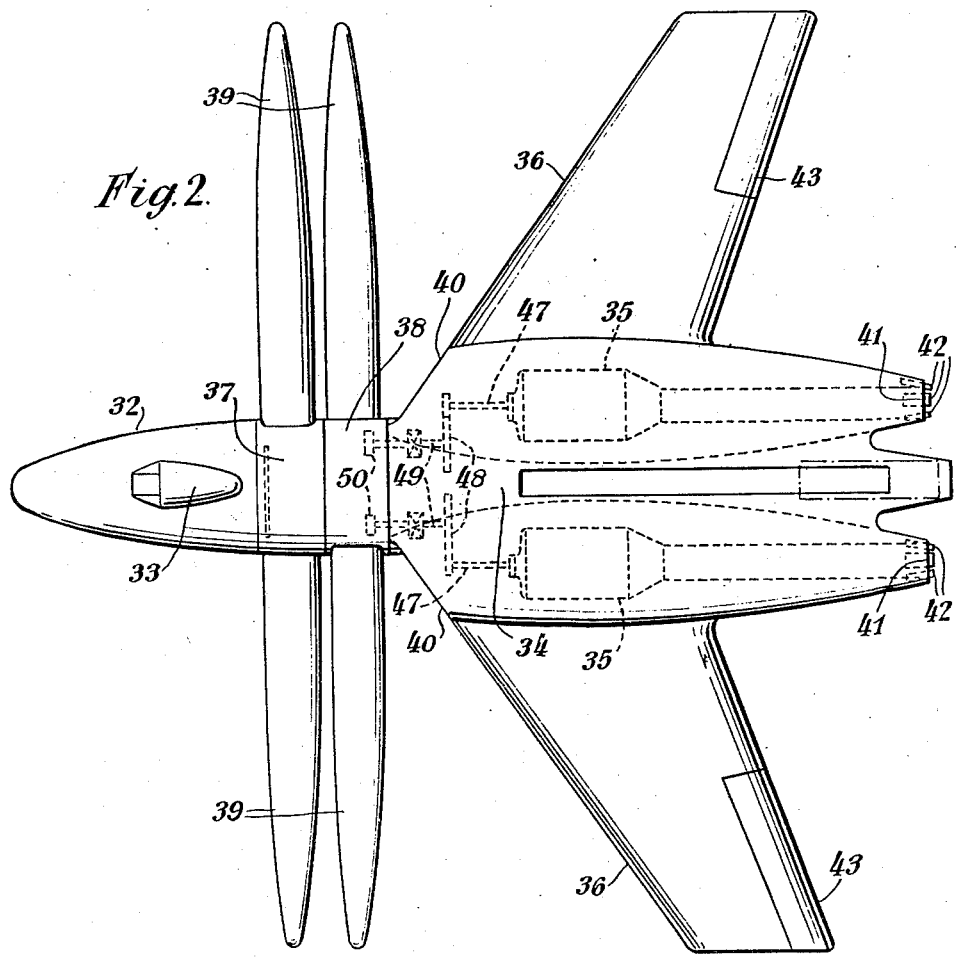
Figure 2 is a plan view of another form of aircraft according to the invention, which is of the kind adapted to ascend and descend in a substantially vertical attitude, and to assume a horizontal attitude when in level or substantially level flight.

The aircraft shown in Figure 2 is of the kind which operates as a helicopter whilst ascending and descending, the airscrews providing direct lift, and as a normal aircraft during substantially horizontal flight, the aircraft standing in a vertical, nose up attitude when on the ground, rising in that attitude, and turning into a horizontal attitude when it reaches a suitable height.

The aircraft has a fuselage comprising a forward portion 32 including a pilot's cockpit 33, and an after portion 34 on each side of which is mounted a gas turbine unit 35, the wings 36, 36, which are of relatively small area and of backswept form, being mounted outwardly of the turbine units. Two counter-rotating variable pitch airscrews 37 and 38 are mounted coaxially with the fuselage, between the forward and after portions 32 and 34. Each airscrew has two blades 39, 39. The gas turbine units 35 are of the known kind having separate turbine wheels and shafts for driving the compressor and for providing the external shaft horse power respectively. Each turbine unit 35 has an air inlet 40 at its forward end and a jet orifice 41 at its rear end, the jet orifices being provided with deflectors such as 42 for varying the direction of emission of the jets therefrom. Four deflectors 42 are provided for each orifice, in opposed pairs at right angles to each other.

Ailerons 43 are provided on the wings, and may be coupled to control means for the deflectors 42 above and below the jet orifices to provide additional control. The connection of the ailerons to the control means is preferably such that the ailerons can be disconnected from the control means and locked. A rudder (not shown) is provided, being mounted on the downwardly projecting fin 44 shown in Figure 3, and may be similarly coupled to the control means for the deflectors at the sides of the orifices.

Figure 4:
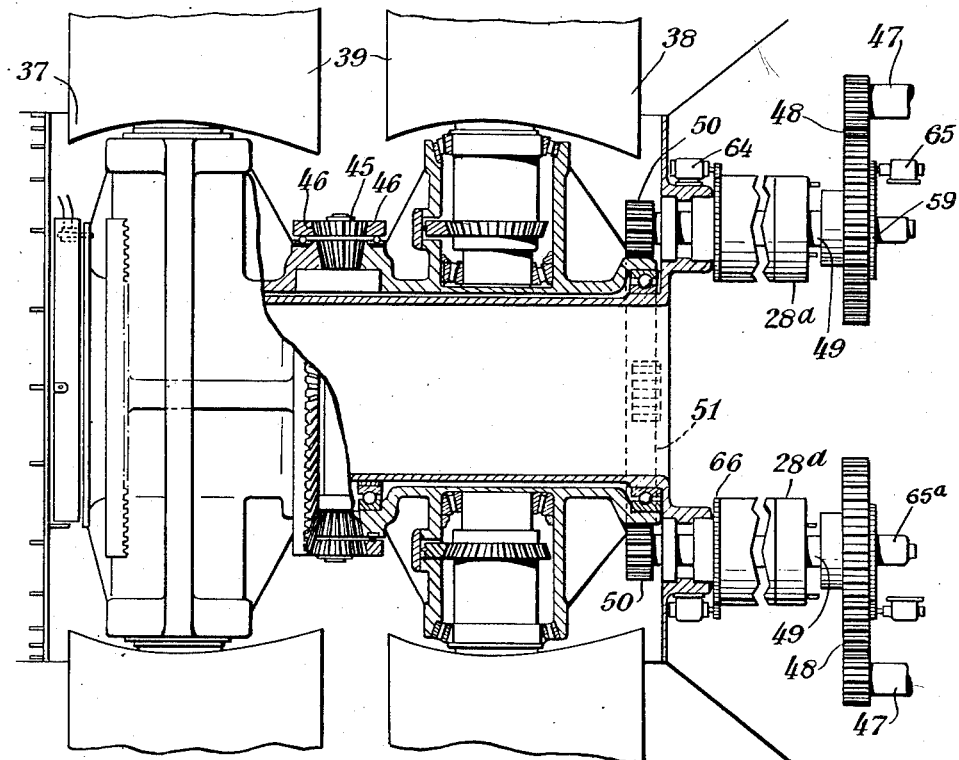
Figure 4 is an enlarged view of the portion of Figure 2 which includes the airscrew hubs, showing the driving means for the airscrews.

The two airscrews 37 and 38 are interconnected by suitable gearing, for example as described in my prior British patent specification No. 568,548 and shown in Figure 4 of the accompanying drawings, in which bevel pinions 45 are shown engaging with bevel teeth 46 on the adjacent ends of the two airscrew hubs.

Each of the gas turbine units has a power take-off shaft 47 driving, through gearing 48 and an intermediate shaft 49, a pinion 50 engaging with a gear ring 51 on the hub of the rear airscrew 38. A clutch 28ᵃ as used in the arrangement shown in Figure 1 is provided between two portions of each intermediate shaft 49.

Figure 3:
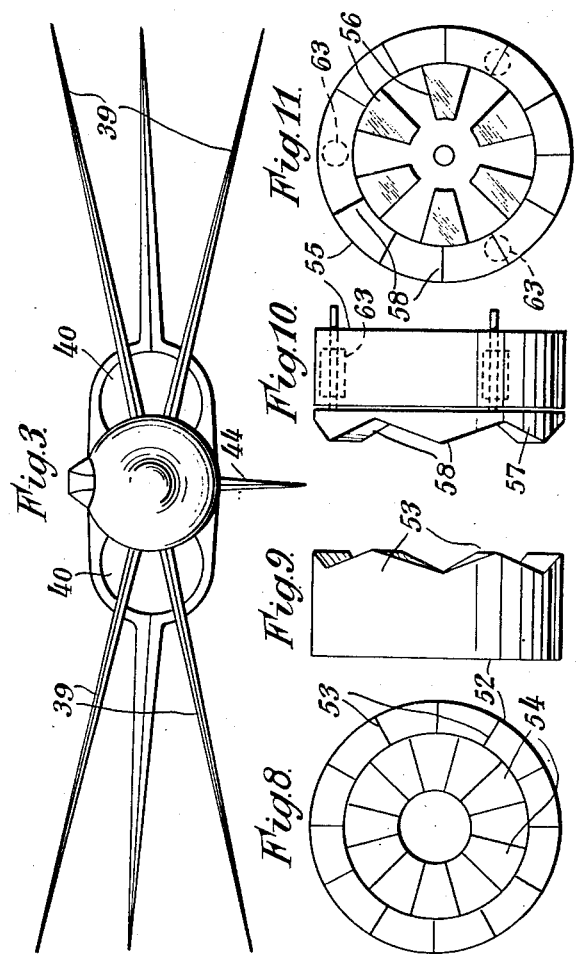
Figure 3 is a front elevation of the aircraft shown in Figure 2.

The following description of the clutch and the operating mechanism for the said clutch refers to Figures 4, 7, 8, 9, 10 and 11 of the accompanying drawings which illustrate an arrangement for use in the aircraft shown in Figures 2 and 3, but it will be readily understood that the same form of clutch, and similar operating mechanism, may be used in the arrangement shown in Figure 1.

Referring to Figure 7, the intermediate shaft 49 comprises two portions 49ᵃ and 49ᵇ, the former of which carries the driven wheel 48ᵃ of the gearing 48, whilst the latter carries the pinion 50. The portion 49ᵃ of the shaft is spigoted in the portion 49ᵇ. The portion 49ᵇ has rigidly mounted thereon one member 52 of the clutch 28ᵃ, the said member having one end face formed about its periphery with a ring of axially projecting shallow V-shaped teeth 53 (see Figure 9), and, within said ring are provided sector shaped recesses 54 (Figure 8). The other member 55 of the clutch 28ᵃ is mounted for longitudinal movement in the portion 49ᵃ of the shaft 49, and has sector shaped projections 56 (see Figure 11) adapted to engage with the recesses 54 in the member 52. A separate ring 57, slidable axially, but not rotatable on the member 55, has teeth 58 complementary to the teeth 53 on the member 52, as shown in Figure 10. An electric motor 59, mounted on the shaft portion 49ᵃ so as to rotate therewith, drives a threaded shaft 60 extending through the hollow interior of the shaft portion 49ᵃ, and engaging with a screw-threaded hole in a boss 61 lying within the shaft portion, and connected by arms 62 passing through slots in the said shaft portion to the clutch member 55. Thus, by causing rotation of the electric motor armature in either direction, the clutch member 55 can be moved into or out of engagement with the clutch member 52. The ring 57 carries the armatures of a number of solenoids 63, the coils of which are mounted on the clutch member 55, the arrangement being such that, by energising the solenoids, the ring 57 is urged towards the clutch member 52, without simultaneous movement of the clutch member 55.

Alternators 64 and 65 are driven by gearing from the shaft portions 49ᵇ and 49ᵃ respectively to operate synchronizing mechanism hereinafter described.

In the aircraft shown in Figures 2 and 3 the airscrews, when stopped, are adapted to act as auxiliary wings, and it is therefore essential that they should come to rest in positions approximating to the plane of the fixed wings. A convenient position is that in which each airscrew lies at an angle of about 15° to the plane of the fixed wings, as shown in Figure 3.

Figure 5:
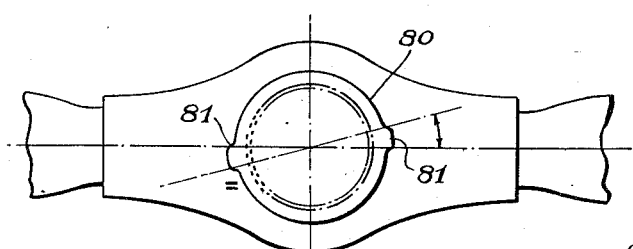
Figures 5 and 6 are details showing mechanism for setting the airscrew blades to a predetermined position when stopped.
Figure 6:
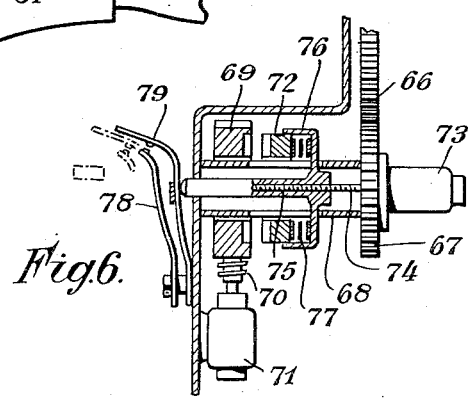

The airscrews, when disconnected from the gas turbine units by releasing the clutches 28ᵃ, will be feathered, and will come to rest aerodynamically, but they may not come to rest in the desired positions. Means are therefore provided for rotating them into the desired positions after they have been disconnected from the turbine units, and such means are combined with locking means for holding them in the desired position. The said means comprise an electric motor driving the airscrews through irreversible gearing such as a worm and worm wheel, and means for stopping the motor when the airscrews reach the desired positions. Referring to Figures 5 and 6, 66 is the gear mounted on the portion 49ᵇ of one of the intermediate shafts 49 for driving the alternator 64, and, meshing with this gear, is a pinion 67 mounted on a shaft 68 having freely mounted thereon one half 69 of a dog clutch, the periphery of the clutch half 69 being formed as a worm wheel to engage with a worm 70 driven by an electric motor 71. The other half 72 of the dog clutch is mounted to slide axially, but not to rotate, on the shaft 68, and is moved along the shaft by an electric motor 73, driving a threaded shaft 74 which is engaged by a member 75 carrying a cup-like housing 76 enclosing a spring 77 which bears on the clutch member 72. The member 75 extends into engagement with one of a pair of electrical contact arms 78, 79, in the circuit of the electric motor 71. The rear airscrew hub carries a ring 80 (Fig. 5) having two radial projections 81, 81 at opposite ends of a diameter, each such projection subtending an angle at the centre of the ring equal to the maximum angle to the plane of the fixed wings which the airscrews are desired to take up when stationary. The contact arm 79 is so positioned and formed that, when the member 75 is in the position it takes up when the dog clutch 69—72 is engaged, it projects into the path of the protuberances, the contacts being then in engagement.

To bring the airscrews to the desired position the electric motor 73 is started, thus engaging the dog clutch 69—72, closing the contacts on arms 78, 79, and projecting arm 79 into the path of the projections 81. The closing of the contacts on arms 78, 79 starts the motor 71, and rotates the airscrews through the worm gearing until one of the projections 81 engages the arm 79 and opens the circuit of the motor 71, thus stopping the motor and the airscrews. The contact arm 79 is so positioned that the projection 81 engages it to open the circuit of the motor 71 when the airscrews are approaching the plane of the fixed wings, and means, hereinafter described, are provided whereby the pilot can re-close the circuit of the motor 71 after it has been opened by the contact arm 79, and set the airscrews to any desired position within an angle of 15° on either side of the plane of the fixed wing. The worm gearing, being irreversible, locks the airscrews in the position to which they are set.

The control of the clutch or clutches 28ª for engagement and disengagement is preferably electrical, and Figures 12 and 13 show respectively the control circuit diagrams for the arrangements shown in Figures 1 and 2.

Referring to Figure 12, 82 and 83 are leads from a battery or other source of direct current, 84 is an electrical unit of known type for automatically varying the pitch of the airscrew blades in accordance with operating conditions, and 85 is a switch also of known type having three positions, in two of which current is fed directly to a pitch changing motor on the airscrew for increasing or decreasing the blade pitch, and in the third of which current is fed to the automatic unit so that the blade pitch varies automatically in such a way as to maintain a substantially constant engine speed.

Two push-button switches 86 and 87 each controlling three pairs of contacts are provided for initiating respectively the engagement of the clutch 28ª and the disengagement thereof, each switch in its "off" position bridging a pair of contacts 88, 89 or 90, 91 to complete the connection of the switch 85 to the lead 82, so that when both switches 86 and 87 are in the "off" position current is supplied to the switch 85, and so to the pitch changing mechanism of the airscrew, in accordance with the setting of the switch 85.

When pushed inwardly to its "on" position, the switch 86 bridges two pairs of contacts 92, 93 and 94, 95, thus connecting the lead 82 to the moving arm 96 of a contactor 97, and to a circuit including a holding coil 98 for the switch 86, and a solenoid coil 99 for setting a motor reversing switch 100 in the circuit of the electric motor 59, this circuit being completed through a limit switch 101, opened mechanically when the clutch 28ª is fully engaged. The movement of the switch 86 to its "on" position opens the contacts 88, 89, and thus disconnects the switch 85 from the lead 82.

The alternator 64 is connected to a synchronous motor 102 driving the cup element 103 of a magnetic drag coupling, the electro-magnet element 104 of which is connected through slip rings 105 to the alternator 65, the said element 104 being mechanically connected to the arm 96 of the contactor 97, so that displacement of the element 104 causes displacement of the arm 96. When the alternators are in synchronism the element 104 assumes a neutral position, and the arm 96 engages a central contact 106 to supply current to the clutch operating mechanism, but any difference between the speed of the alternators displaces the arm 96 in one direction or the other to engage contact 107 or 108, and supply current through leads 109 or 110 to the pitch changing mechanism of the airscrew, so as to adjust the speed of the latter, by changing its pitch, and achieve synchronism of the two alternators.

The contact 106 is connected to one end of the solenoid coils 63, their other ends being connected to the lead 83, and also, through contacts 111 closed by the full engagement of the teeth 53, 58, of the members 52, 55 of the clutch 28ª, to a solenoid 112 which, when energised, closes a switch 113 completing a circuit from the contact 106 to the motor 59 through the reversing switch 100. The reversing switch 100 comprises a rocking member 114 carrying two bridging members 115 and 116 each adapted to connect a central contact to either of two side contacts, and thereby complete the circuit through the motor field and armature, the direction of current flow in the field depending on the direction of displacement of the member 114, whilst the direction of current flow in the armature is the same for either direction of displacement of the member 114.

The switch 87 is similar to the switch 86, movement of the said switch to the "on" position opening the contacts 90, 91 and closing a pair of contacts 117 and 118 to connect the arm 96 of the contactor to the lead 82, and also closing a pair of contacts 119, 120 to energise a holding coil 121 for the switch 87 and a solenoid coil 122 acting on the reversing switch 100 to set it in the opposite position to that in which it is set by the coil 99.

A limit switch 123, mechanically opened when the clutch 28ª is fully disengaged breaks the circuit through the solenoid coil 122 and holding coil 121, the limit switch 123 being operated in common with a switch 124 which closes when the switch 123 opens to maintain a supply of current to the pitch changing mechanism of the airscrew until it has moved to the feathered position, when the circuit is broken by known means in the pitch changing mechanism and the switch 124 opens automatically by reason of the deenergisation of a holding coil 125.

Thus, when the aircraft is in the air and has reached a speed at which the pilot desires to use the jet alone for propulsion, the pilot adjusts the throttle until the air flow tends to rotate the airscrew at least as fast as it is being driven by the engine, and then moves the switch 87 to the "on" position, in which position it is held by the coil 121, the coil 122 being energised to move the reversing switch 100 to a position in which the motor 59 will rotate in a direction to separate the members 52 and 55 of the clutch 28ª. The clutch 28ª being engaged, the alternators 64 and 65 are in synchronism, and the switch 113 is closed, so the motor 59 is driven to separate the clutch members. When the clutch members are fully separated, the limit switch 123 opens, allowing the switch 87 to move to its "off" position and the reversing switch 100 to move to its neutral position. The movement of the switch 87 to its "off" position de-energises the solenoid 112 and allows the switch 113 to open, and also opens the circuit of the solenoids 63.

To re-engage the clutch 28ª, the pilot after adjusting the speed of the turbine unit to a value such that the airflow over the airscrew can, when the pitch is decreased, rotate it at a speed at least as great as that of the turbine unit, moves the switch 86 to its "on" position, thus connecting the contact arm 96 to the lead 82 and setting the reversing switch 100 as that the motor 59, when energised, will rotate in a direction to engage the clutch members. As the airscrew is feathered, the alternator 64 is not rotating, and the magnetic drag coupling displaces the arm 96 into engagement with the contact 107 to supply current to the pitch changing mechanism of the airscrew to decrease the pitch. The airscrew is then rotated by the relative wind, and the contactor 97 controls the pitch changing mechanism to bring the clutch member 52 rotating with the airscrew into synchronism with the clutch member 55, rotating with the gas turbine unit. When synchronism is reached, the arm 96 engages the central contact 106, and the solenoids 63 are energised to move the ring 57 so that its teeth 56 engage with the teeth 53 on the clutch member 52. When the teeth are in full engagement, the clutch members are in such relative positions that the projections 56 will enter the recesses 54, and the contacts 111 are closed, thus closing the switch 113 and starting up the motor 59 to move the clutch members into engagement. When full engagement is achieved, the limit switch 101 opens, and the switch 86 moves to its "off" position, whilst the reversing switch 108 is again neutralised, the switch 113 opened, and the solenoids 63 de-energised. The airscrew can then be controlled through the switch 83 in the known manner.

The circuit shown in Figure 13 is generally similar to that shown in Figure 12, but is duplicated so that each of the two gas turbine units can be connected to or disconnected from the airscrews regardless of whether the other is connected or disconnected. In this arrangement, however, synchronism is brought about by varying the speed of the turbine unit to be connected to the airscrew, by means of its throttle control.

"Engage" and "Disengage" buttons 86 and 87 are provided for each turbine unit, together with a reversing switch 100 and clutch control means 63, 111, 112, 113 as previously described, the latter not being shown, but comprising a unit indicated by the dotted rectangle 126. The control unit for the airscrew is shown at 84, and the manual switch at 85, as in the previous arrangement. A single alternator 64 is driven from the airscrew, and separate alternators 65, 65ᵃ are driven from the two gas turbine units, each of the latter being coupled through slip rings 105 to the electro-magnet element 104 of one of a pair of magnetic drag couplings, the cup elements 103 of both of which are driven by a single synchronous motor 102 driven by the alternator 64.

In this arrangement, two relays 127 are provided, which are operated by the current from the alternator 64, and, when no current is being produced by the said alternator, connect the contacts 93 of the "engage" switches directly to the contact of the switch 85, through which current is fed to the pitch changing motor of the airscrew to reduce the pitch and, when, due to rotation of the airscrews, current is produced by the said alternator, disconnect the said contacts 93 from the switch 85, and connect them to the arms 96 of the contactors 97, the contacts 108 and 109 of which are connected to opposed solenoids actuating the throttle levers 128 of the two turbines.

The operation for disengagement of either turbine unit from the airscrew is as described in the previous example, and, when both are disengaged, and the limit switches 123 have opened as described, switches 129 and 130, mechanically connected to the said limit switches, move to the positions shown in Figure 13, in which the lead 82 is connected, through the said switches and through a switch 131, to the pitch changing motor 132 of the airscrews, to move the airscrews to the feathered position. The switch 131 is opened mechanically when the airscrew is fully feathered, and is reclosed when one of the clutches 28ᵃ is re-engaged, the movement of switch 129 or 130 as a result of such re-engagement energising a solenoid 133 which re-closes the switch 131, and, in doing so, breaks its own circuit. The airscrews are thus feathered automatically when they are disconnected from the turbine units.

The alternator 64, when running, supplies current to a solenoid 134 to hold open a switch 135 which, when closed, connects the lead 82 to the motors 71 and 73 of the mechanism for setting the airscrews to a predetermined position, the connection to the motor 73 being through a limit switch 136. The circuit of motor 71 remains open at the switch 137, which comprises contacts 78, 79 (Figure 6). The direction of running of the motor 73 is controlled by a mechanically operated reversing switch 138 tripped automatically at full engagement or disengagement of the clutch 69, 72. As soon as the airscrews stop, therefore, the motor 73 starts up and engages the clutch 69, 72, at the same time closing the switch 137 and starting the motor 71, which inches the airscrews round until the switch 137 is opened by one of the projections 81 on the rear airscrew hub. The limit switch 136 is operated when the clutch 69, 72 is fully engaged, to break the connection between the lead 82 and the reversing switch 138, and make a connection between said reversing switch and the relays 127, through which the motor 73 receives current for reverse rotation when the airscrews are re-connected to the turbines. If the pilot desires to adjust the positions of the airscrews within the range provided by the circumferential extension of the projections 81, he closes a switch 139 in parallel with switch 137, and holds it closed until the desired position is reached.

To restart the airscrew, one of the "engage" switches 86 is operated, and current is supplied through contact 93, relay 127 and switch 85 to the pitch-changing motor 132 to unfeather the airscrew, and also through switch 136 to the motor 73 to release the clutch 69, 72, which, whilst engaged, holds the airscrew locked by means of the worm 76 and the worm wheel on the clutch member 69. The alternator 64 is thus started, and the relay 127 operates to connect the lead 82 to the contactor 97, by which the speed of the turbine unit is adjusted until the latter is in synchronism with the airscrew, the clutch 28ᵃ being then engaged as previously described. The other turbine may be subsequently connected to the airscrew by operation of the other switch 86, the lead 82 in that case being already connected to the contactor 97, as the alternator 64 is running.

Means are provided for automatically disconnecting either turbine unit from the airscrew in the event of failure of such unit, such means comprising a switch 140, normally open but closed by a reverse torque between the airscrews and turbine unit to energise a solenoid 141 and close a switch 142 which energises the holding coil 121 of the "disengage" switch, moves that switch to the "on" position, and so disengages the clutch 28ᵃ between that turbine unit and the airscrew. Contacts 143, 144 associated with the throttle control are opened when the throttle is at or near its closed position, to prevent disengagement of the clutch when the throttle is intentionally closed.

Figure 14 shows the control mechanism for the deflectors 52 above and below the jet nozzles which control the inclination of the jets from the nozzles 41 to the longitudinal axis in a vertical sense. The deflectors 42 are each connected by a cable 145 to a pulley 146 mounted on an arm 147 projecting from a box 148, each pulley being mounted to rotate with a pinion 149 engaging a rack 150 slidable in the box 148. A gear casing 151 mounted for both rocking and translatory movement on the box 148 carries two co-axial shafts 152, 153, on each of which is mounted, by means of a universal joint, a gear wheel 154 engaging two of the racks 150, one wheel 154 engaging the racks connected to the upper deflectors at the two jet orifices, and the other wheel 154 engaging the racks connected to the lower deflectors. Each of the shafts 152, 153 carries a bevel pinion 155 meshing with a bevel wheel 156 mounted on a shaft 157 projecting from the casing and carrying a sprocket 158 connected by a chain 159 to a second sprocket 160 mounted on a hand lever 161 mounted for rocking movement in a lateral sense on a pillar 162 integral with the gear casing 151. Thus, by rocking the hand lever 161 in a fore-and-aft direction, the gear casing 151 is rocked through the pillar 162, and both upper or both lower deflectors are projected rearwardly, giving downward or upward deflection of the jets. Lateral movement of the hand lever 161 causes rotation of the gear wheels 154 in opposite directions, thus projecting one upper and one lower deflector to cause the aircraft to bank. These two movements can, of course, be combined.

The side deflectors are connected by cables to foot-operated mechanism corresponding to the usual rudder bar or rudder pedals, the movement of the outer deflectors preferably being limited so that the jets cannot be deflected laterally inwardly to strike the tail of the aircraft.

Figure 15 shows, on an enlarged scale, one of the jet nozzles 41, and the deflectors 42 associated therewith. The deflectors 42, when withdrawn, lie between the jet nozzle 41 and an outer skin 163, are curved transversely, and have a rectilinear sliding movement in a direction inclined to the axis of the jet nozzle.

Provision may be made for mounting a rocket of either the solid or the liquid fuel type on or in the tail of the aircraft to provide additional thrust when required.

What I claim is:

1. In an aircraft having a fixed wing, a propulsion unit comprising a gas turbine having a rotor and providing an exhaust jet for propelling the aircraft by jet action, an airscrew unit, disconnectible clutch means having a first mating element rotating with the rotor of said gas turbine unit and a second mating element rotating with the blades of said airscrew unit, means to feather said blades and means to disconnect said mating elements, the improvement that comprises means to set said blades to a predetermined angle with relation to said fixed wing, said angle being defined between the horizontal plane of said wing and the longitudinal axis of said blades, said last-named means comprising an electric motor operatively connected to rotate said blades, a normally open switch in the electrical circuit of said electric motor, means adjustable to a position of engagement with said switch to close said circuit to cause said electric motor to rotate said blades, circuit opening means carried by said blades, said switch when closed by said adjustable means being disposed in the path of travel of said circuit opening means whereby said circuit opening means will again open said electrical switch when said blades have attained the predetermined angular relation with said wing.

2. In an aircraft having a propulsion unit comprising a gas turbine having a rotor and providing an exhaust jet for propelling the aircraft by jet action, an airscrew unit, disconnectible clutch means having a first mating element rotating with said gas turbine unit and a second mating element rotating with the blades of said airscrew unit, means to feather said blades and means to disconnect said mating elements, the improvement that comprises means to set the said blades with their longitudinal axes in a predetermined position, said last-named means comprising an electric motor operatively connected to rotate said blades, a normally open switch in the electrical circuit of said electric motor, means adjustable to a position of engagement with said switch to close said circuit to cause said electric motor to rotate said blades, and circuit opening means carried by said blades, said switch when closed by said adjustable means being disposed in the path of travel of said circuit opening means whereby said circuit opening means will again open said electrical switch when said blades have attained the predetermined position.

3. In an aircraft having a propulsion unit comprising a gas turbine having a rotor and providing an exhaust jet for propelling the aircraft by jet action, an airscrew unit, disconnectible clutch means having a first mating element rotating with said gas turbine unit and a second mating element rotating with the blades of said airscrew unit, means to feather said blades and means to disconnect said mating elements, the improvement that comprises means to set the said blades with their longitudinal axes in a predetermined position, said last-named means comprising power means operatively connected to rotate said blades, control means for said power means, means to actuate said control means to initiate operation of said power means, and control operating means carried by said blades, said control means when actuated to initiate operation of the power means being disposed in the path of travel of said control operating means whereby said control operating means will operate the control means to stop said power means when the blades have attained the predetermined position.

JAMES ROBERT ANDERSON.

References Cited in the file of this patent

UNITED STATES PATENTS

| Number | Name | Date |
|---|---|---|
| 1,879,187 | Goddard | Sept. 27, 1932 |
| 2,162,956 | Lysholm | June 20, 1939 |
| 2,179,568 | White | Nov. 14, 1939 |
| 2,361,127 | Sampietro | Oct. 24, 1944 |
| 2,380,889 | Waseige | July 31, 1945 |
| 2,382,460 | Young | Aug. 14, 1945 |
| 2,395,809 | Goddard | Mar. 5, 1946 |
| 2,423,183 | Forsyth | July 1, 1947 |
| 2,427,846 | Forsyth | Sept. 23, 1947 |
| 2,444,781 | Leonard | July 6, 1948 |
| 2,465,538 | Jensen | Mar. 29, 1949 |
| 2,474,685 | McCollum | June 28, 1949 |
| 2,479,125 | Leonard | Aug. 16, 1949 |
| 2,499,401 | Madden | Mar. 7, 1950 |
| 2,571,848 | Ehlers | Oct. 16, 1951 |

FOREIGN PATENTS

| Number | Country | Date |
|---|---|---|
| 495,469 | Great Britain | Feb. 8, 1937 |
| 706,084 | Germany | Apr. 10, 1941 |